W. CRAIG.
Corn-Planter.
No. 40,822. Patented Dec. 8, 1863.
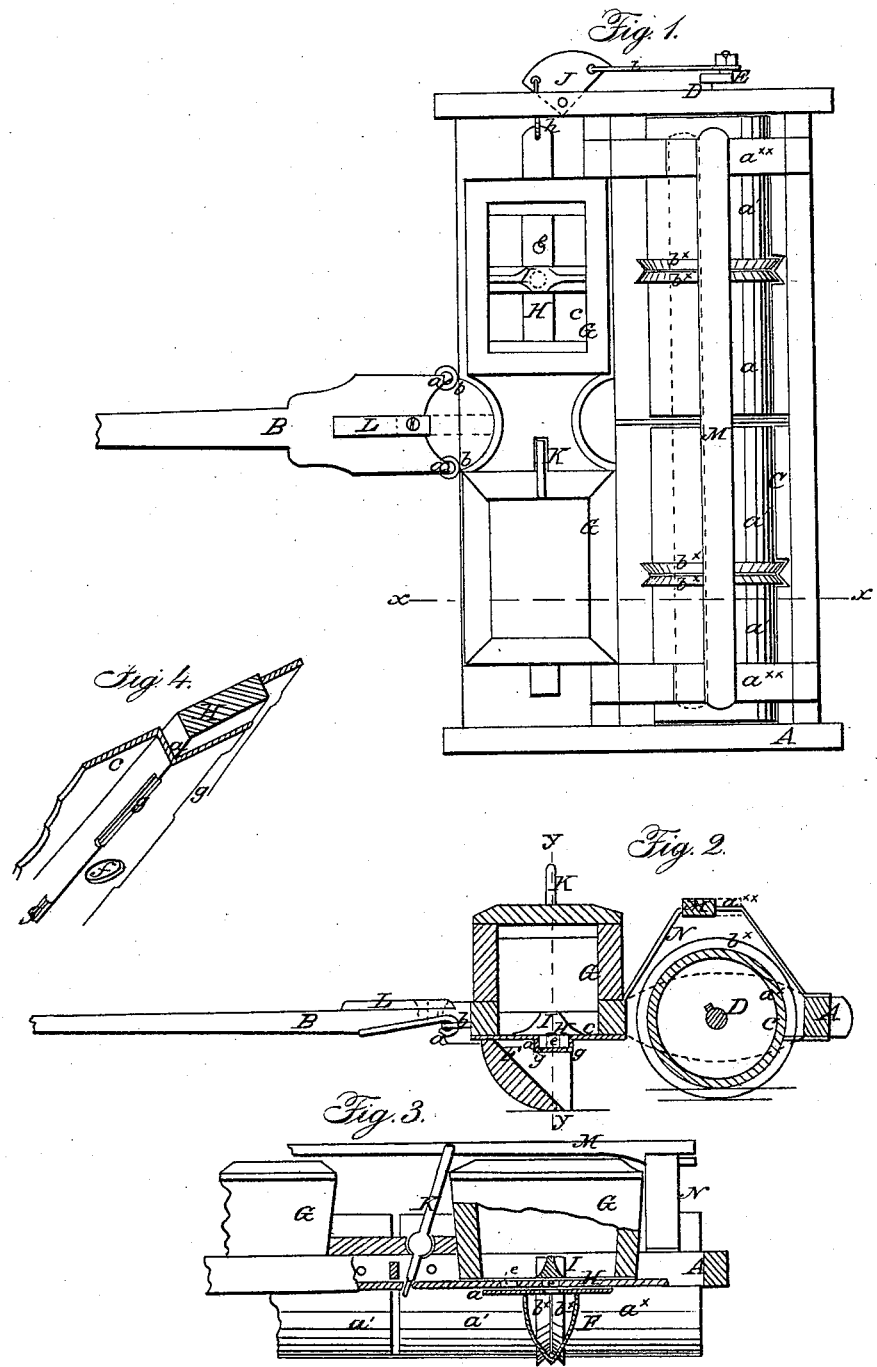
Witnesses:
J W Coombs
Geo B Reed
Inventor:
William Craig
per Munn & Co
atty

UNITED STATES PATENT OFFICE.

WILLIAM CRAIG, OF URBANA, ILLINOIS.

IMPROVEMENT IN CORN-PLANTERS.

Specification forming part of Letters Patent No. 40,822, dated December 8, 1863.

*To all whom it may concern:*

Be it known that I, WILLIAM CRAIG, of Urbana, in the county of Champaign and State of Illinois, have invented a new and Improved Seed-Planter; and I do hereby declare that the following is a full, clear, and exact description of the same, reference being had to the accompanying drawings, making a part of this specification, in which—

Figure 1 is a plan or top view of my invention; Fig. 2, a side sectional view of the same, taken in the line $x\,x$, Fig. 1; Fig. 3, a front sectional view of the same, taken in the line $y\,y$, Fig. 2; Fig. 4, an enlarged perspective view of a portion of the seed-distributing device.

Similar letters of reference indicate corresponding parts in the several figures.

To enable those skilled in the art to fully understand and construct my invention, I will proceed to describe it.

A represents a rectangular frame, which has a draft-pole, B, attached to its front end by hooks $a$, fitting in eyes or staples $b$. In the back part of this frame A there is a roller, C, formed of sections $a'\,a'\,a'\,a^{\times}$, all of which except one, $a^{\times}$, are placed loosely on a shaft, D, having a crank, E, at one end of it. The section $a^{\times}$, in consequence of being attached to the shaft D, causes the latter to rotate as the device is drawn along. Each section of the roller C has a flange, $b^{\times}$, at one end, and the ends which are provided with these flanges are placed contiguous to each other, so as to form rotary seed-coverers which are in line with the furrow-shares F. The flanges $b^{\times}$ are beveled at their outer sides, as shown clearly in Fig. 1.

G G represent two seed-boxes, which are placed on the front part of the frame A, and are provided with bottoms $c\,c$, having each a recess, $d$, at their centers in which a slide-bar, H, is fitted and works, the upper surface of the slide-bar being flush with the bottoms $c$, as shown clearly in Fig. 2. The slide-bar H has two holes, $e\,e$, made through it near each end, and these holes, as the slide-bar H is moved first to the right and then to the left, pass alternately under a cut-off bar, I, and the seed drops through holes $f$, made in the bottoms of the recesses $d$. This mode of distributing seed by means of a reciprocating slide is well known and does not require a minute description. At the lower edges of the recesses $d$ of the bottoms $c$ of the seed-boxes, at each side, there are made oblong slots $g$, (see Figs. 2 and 4,) which admit of dust and dirt escaping from said recesses and prevent the latter from becoming choked or clogged—a contingency which would otherwise be likely to occur. One end of the slide-bar H is connected by a link, $h$, with a quadrant-shaped lever, J, which is also connected by a link, $i$, to the crank E of the shaft D. By this means a reciprocating movement is communicated to the slide-bar H from the crank E.

K is a hand-lever, which is fitted in the front part of the frame A, and has its lower end passing into the slide-bar H, as shown clearly in Fig. 3.

The back parts of the furrow-shares F are forked, and said forked ends are directly under the holes $f$ in the bottoms of the recesses $d$.

When the seed is to be sown in rows the slide-bar H is operated automatically from the shaft D by the means previously described, the shares F making the furrows, the flanges $b^{\times}$ of the sections of the roller C covering the seed and compacting the earth snugly over it. When the seed is to be planted in check-rows the ground is marked in one direction by going over it in one direction with the roller only, the lever J being disconnected from the crank E by disengaging the link $i$ from said lever and elevating the shares F above the surface of the earth by means of a button, L, which is at the back part of the draft-pole, and which on being turned with its longer end inward, as shown in red, Fig. 1, will project over the front end of the frame A and serve to keep the same elevated. The frame A is thus elevated at any time when the shares F are not required to operate. The flanges B mark the ground, and the machine is then—after the draft-pole is released by turning the button L back to its original position—drawn over the field at right angles to said marks and the seed dropped on the marks by a boy or attendant who operates the slide-bar H by means of the hand-lever K.

M is the driver's seat, the ends of which are slotted longitudinally and fitted on the horizontal parts $a^{\times\times}$ of supports N, one at each side of the frame A. This seat is directly over the roller C, and it may be moved farther forward or backward to throw more or less weight on the shares F, as may be desired.

The invention is more especially designed for planting corn; but it may be used advantageously for planting various other seeds.

Having thus described my invention, what I claim as new, and desire to secure by Letters Patent, is—

1. The roller C, constructed of sections $a'\ a'\ a'\ a^{\times}$, which are provided with flanges $b^{\times}$, as shown, for the purpose specified.

2. The button L, attached to the back part of the draft-pole B, and arranged, as shown, for the purpose of keeping the front part of the frame A elevated and the shares F above the surface of the earth when required.

3. Arranging or placing the driver's seat M on supports N, the upper parts of which are horizontal and are fitted in slots made longitudinally in the ends of the seat M to admit of the adjustment of the latter, as set forth.

WILLIAM CRAIG.

Witnesses:
L. N. McLEAN,
A. T. STONE.